United States Patent Office 3,117,987
Patented Jan. 14, 1964

3,117,987
DICYCLOPROPYLKETOXIME DERIVATIVES
Bruce W. Horrom, Waukegan, Ill., assignor to Abbott Laboratories, North Chicago, Ill., a corporation of Illinois
No Drawing. Filed Sept. 4, 1959, Ser. No. 838,023
6 Claims. (Cl. 260—463)

This invention relates to novel dicyclopropylketoxime derivatives and the methods of their preparation. In particular, this invention relates to novel O-acyl derivatives of dicyclopropylketoxime.

The starting reactant, dicyclopropylketoxime, is represented by the following structural formula:

I 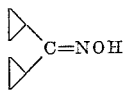

This compound possesses important pharmacological properties as a muscle relaxant, and such properties have been disclosed in our copending application, Serial No. 630,086, filed December 24, 1956, and issued as U.S. Patent 2,916,417.

The novel compounds disclosed herein are represented by the following structure:

II 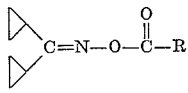

where R is selected from the class consisting of a lower alkyl group having 1 to 5 carbon atoms, both straight and branched; loweralkoxy groups; cycloalkyl groups such as cyclopropyl, cycloheptyl and the intermediate cycloalkyl groups; haloalkyl groups such as mono-, di- and omega tri-chloromethyl, propyl and butyl; loweralkoxy phenyl such as trimethoxyphenyl; and loweralkylene carboxylic acid groups and loweralkyl esters of said lower alkylene carboxylic acid groups.

The novel compounds of this invention are also bis-dicyclopropylketoxime derivatives represented by the structure:

III 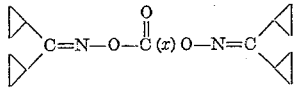

where $x$ is selected from the class consisting of naught or a lower alkylene carbonyl group represented by

where R' is lower alkylene.

The compounds where R is a loweralkyl group, as previously defined in general Formula II, are prepared by reacting starting reactant I with a loweralkyl acid anhydride such as acetic, propionic, butyric or valeric at room temperature or at reflux temperatures. These compounds may also be prepared by employing loweralkyl acid halides such as acetyl, propionyl, butyryl or valeryl at room or ice-bath temperatures.

Also, compounds of general Formula II where R is a loweralkyl carboxylic acid group are prepared by reacting dicyclopropylketoxime with corresponding anhydrides of dicarboxylic acids such as succinic, glutaric, adipic, pimelic or suberic. The free carboxylic acid group can be esterified with a loweralkyl alcohol such as methanol, ethanol, propanol, butanol and the like. In an alternative procedure, the β-carbalkoxyalkyl acid halide, β-carbethoxypropionyl chloride may be reacted with I to prepare the compound where R is an ethyl ester of the ethyl carboxylic acid. By process steps described in more detail hereinafter, other β-carbalkoxyalkyl acid halide groups may be reacted with compound I. Such representative reactants are β-carbomethoxyacetyl chloride, β-carbopropoxybutyl chloride, β-carbobutoxypropionyl chloride and the like.

Compounds of the type II where R is cycloalkyl are prepared by reacting the ketoxime I with appropriate alkyl acid halides such as cyclopropanecarbonyl chloride, cyclobutanecarbonyl chloride, cyclopentanecarbonyl chloride, cyclohexanecarbonyl chloride, cycloheptanecarbonyl chloride and the like. The reaction is conducted at room or ice-bath temperatures in the presence of an acid acceptor selected from organic amines; triethylamine, trimethylamine, tripropylamine or in the presence of inorganic bases such as sodium carbonate and sodium bicarbonate.

Similar procedure steps are followed to prepare compounds where R is a loweralkoxy group in Formula II. The alkoxy acid halide reactant may be selected from among loweralkyl halocarbonates such as methylchlorocarbonate, ethylchlorocarbonate, propylchlorocarbonate, butylchlorocarbonate, pentylchlorocarbonate and the like. The halogenated alkyl acid halides and alkoxy-substituted aromatic acid halides defined hereinbefore are also reacted with dicyclopropylketoxime according to the foregoing process to form the corresponding o-acyl derivatives.

The bis compounds represented in general Formula III are prepared by reacting two moles of dicyclopropylketoxime in the presence of an acid acceptor, as defined hereinbefore, with an alkyl acid halide such as phosgene, succinyl chloride, malonyl chloride, glutaryl chloride, adipyl chloride or pimelyl chloride.

The foregoing methods of preparation may employ reactants which have distinct chemical structures, but all of the foregoing reactions are uniformly characterized in that o-acyl derivatives of dicyclopropylketoxime are obtained thereby.

The novel compounds disclosed herein possess useful muscle relaxant and tranquilizing pharmacological properties. The pharmacological property identified as muscle relaxation is intended to mean that action well known and understood by the skilled pharmacologist. Such properties are distinct from those exhibited by hypnotics which severely depress the central nervous system. Muscle relaxants are believed to ease the tension of skeletal muscle by interrupting the synaptic transmissions within the spinal cord. The tranquilizing properties are observed from changes in animal behavior; thus, normal aggression is reduced in animals such as monkeys and dogs.

The following specific examples are presented to illustrate methods of preparing the novel compounds disclosed herein. It should be understood that said examples are not intended to exclusively define the scope of the novel compounds or the method by which they are prepared.

EXAMPLE I

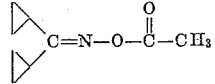

*O-Acetyl Dicyclopropylketoxime*

To 37.5 g. (0.3 mole) of dicyclopropylketoxime is added 60 cc. of acetic anhydride and the mixture is refluxed for 12 hours. The mixture is cooled and poured into water and potassium carbonate is added thereto to neutralize the excess acetic anhydride. The oil layer in the reaction mixture is taken up in ether and washed once with dilute sodium bicarbonate solution and once with water. The extract is dried over magnesium sulfate. The solvent extract is then concentrated and filtered, and the resulting oil is collected by distillation in a yield of 45 g. (90%) having a B.P. of 97–98° C. (0.1 mm.), $n_D^{25}$ 1.493.

*Analysis.*—Calcd. for $C_9H_{13}NO_2$. Theory: C, 64.65%; H, 7.84%; N, 8.38%; O, 19.14%. Found: C, 64.58%; H, 7.92%; N, 8.19%; O, 19.02%.

EXAMPLE II

O-Propionyl Dicyclopropylketoxime

The process steps of Example I are employed with the modification that propionic anhydride is substituted for acetic anhydride. The product is collected in a yield of 86%, $n_D^{25}$ 1.4896, B.P. 96–99° C. (0.2 mm.).

*Analysis.*—Calcd. for $C_{10}H_{15}NO_2$. Theory: C, 66.27%; H, 8.34%; N, 7.73%; O, 17.66%. Found: C, 66.48%; H, 8.51%; N, 7.92%; O, 17.73%.

EXAMPLE III

O-Cyclopropanecarbonyl Dicyclopropylketoxime

To a mixture of 37.5 g. (0.3 mole) of dicyclopropylketoxime, 30.4 g. (0.3 mole) of triethylamine and 300 cc. of dry ether is added 31.35 g. (0.3 mole) of cyclopropanecarbonyl chloride in 100 cc. of dry ether in dropwise manner with stirring and cooling of the reaction mixture. After the addition is completed, the reaction mixture is stirred overnight and following this period, the reaction mixture is then filtered and the resulting triethylamine hydrochloride is washed with dry ether. The wash is combined with the filtrate and concentrated, whereupon 57.4 g. of a colorless, crude oil is obtained. After distilling the oil, there is obtained 52.6 g. (90%) of a clear, colorless oil which is the product, o-cyclopropanecarbonyl dicyclopropylketoxime, B.P. 124–128° C. (0.28 mm.), and $n_D^{25}$ 1.5112.

*Analysis.*—Calcd. for $C_{11}H_{13}NO_2$. Theory: C, 68.37%; H, 7.82%; N, 7.25%; O, 16.56%. Found: C, 68.18%; H, 8.07%; N, 7.19%; O, 16.64%.

EXAMPLE IV

O-Cyclobutanecarbonyl Dicyclopropylketoxime

The product of this example is prepared by the process outlined in Example III with the modification that cyclobutanecarbonyl chloride is substituted for the cyclopropanecarbonyl chloride reactant. The compound, o-cyclobutanecarbonyl dicyclopropylketoxime, is collected as an oil in a yield of 82%, B.P. 124–125° C. (0.6 mm.), $n_D^{25}$ 1.5064.

*Analysis.*—Calcd. for $C_{12}H_{17}NO_2$. Theory: C, 69.54%; H, 8.27%; N, 6.76%; O, 15.44%. Found: C, 69.75%; H, 8.30%; N, 6.80%; O, 15.25%.

EXAMPLE V

O-Trichloroacetyl Dicyclopropylketoxime

The product of this example is prepared by the process steps outlined in Example III with the modification that trichloroacetyl chloride is substituted for the cyclopropanecarbonyl chloride reactant of Example III. The product, o-trichloroacetyl dicyclopropylketoxime is obtained in a yield of 84%, M.P. 65–66° C.

*Analysis.*—Calcd. for $C_8H_{10}Cl_3NO$. Theory: C, 39.95%; H, 3.75%; Cl, 39.31%; N, 5.17%. Found: C, 39.79%; H, 3.71%; Cl, 39.27%; N, 5.25%.

EXAMPLE VI

O-(3,4,5)-Trimethoxybenzoyl Dicyclopropylketoxime

The product of this example is prepared according to the process steps outlined in Example III with the single exception that 3,4,5-trimethoxybenzoyl chloride is substituted for the cyclopropanecarbonyl chloride reactant of Example III. The product, o-(3.4.5)-trimethoxybenzoyl dicyclopropylketoxime, is collected in a yield of 75%, M.P. 96–97° C.

*Analysis.*—Calcd. for $C_{17}H_{21}NO_5$. Theory: C, 63.93%; H, 6.63%; N, 4.39%; O, 25.05%. Found: C, 64.01%; H, 6.29%; N, 4.54%; O, 25.23%.

EXAMPLE VII

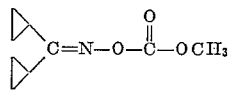

O-Carbomethoxy Dicyclopropylketoxime

The product of this example is prepared according to the process steps outlined in Example III, but with the sole exception that methylchlorocarbonate is substituted for the cyclopropanecarbonyl chloride reactant of Example III. The product, o-carbomethoxy dicyclopropylketoxime, is collected in a yield of 42%, B.P. 90–94° C. (0.3 mm.), $n_D^{25}$ 1.4874.

*Analysis.*—Calcd. for $C_9H_{13}NO_3$. Theory: C, 59.00%; H, 7.15%; N, 7.65%; O, 26.20%. Found: C, 59.18%; H, 7.18%; N, 7.80%; O, 26.51%.

EXAMPLE VIII

O-Carbethoxy Dicyclopropylketoxime

The product of this example is prepared according to the process steps of Example III with the single exception that ethylchlorocarbonate is substituted for the cyclopropanecarbonyl chloride reactant of Example III. The compound, o-carbethoxy dicyclopropylketoxime, is collected as an oil in a yield of 85%, B.P. 103–105° C. (0.4 mm.), $n_D^{25}$ 1.4845.

*Analysis.*—Calcd. for $C_{10}H_{15}NO_3$. Theory: C, 60.89%; H, 7.67%; N, 7.10%; O, 24.34%. Found: C, 60.89%; H, 7.63%; N, 7.33%; O, 24.62%.

EXAMPLE IX

O-Carbopropoxy Dicyclopropylketoxime

The product of this example is prepared according to the process steps of Example III with the single exception that the propylchlorocarbonate is substituted for the cyclopropanecarbonyl chloride reactant of Example III. The product, o-carbopropoxy dicyclopropylketoxime, is collected as an oil in a yield of 76%, B.P. 115–116° C. (0.7 mm.), $n_D^{25}$ 1.4803.

*Analysis.*—Calcd. for $C_{11}H_{17}NO_3$. Theory: C, 62.54%; H, 8.11%; N, 6.63%; O, 22.72%. Found: C, 61.99%; H, 8.03%; N, 6.85%; O, 23.05%.

The following examples teach the preparation of aliphatic carboxylic acid derivatives of dicyclopropylketoxime and esterified products of said aliphatic carboxyl derivatives.

EXAMPLE X

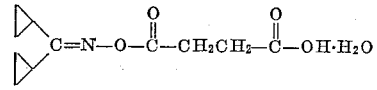

O-(β) Carboxypropionyl Dicyclopropylketoxime Monohydrate

A mixture is formed from 50 g. (0.5 mole) of succinic anhydride, 62.5 g. (0.5 mole) of dicyclopropylketoxime and 600 cc. of dry acetone. The mixture is reacted at reflux temperatures for 16–18 hours and, thereafter, the acetone is removed and an oil is obtained which solidifies upon scratching and rubbing. The solid material is separated and recrystallized from an ether-pentane mixture, whereupon o-(β) carboxypropionyl dicyclopropylketoxime is obtained in a yield of 71 g. (63%), M.P. 69–72° C. Further recrystallization provides a M.P. of 76–78° C. which are characterizes the product as being present in its monohydride form.

*Analysis.*—Calcd. for $C_{11}H_{15}NO_4 \cdot H_2O$. Theory: C, 54.31%; H, 7.0%; O, 32.89%; N, 5.76%. Found: C, 54.45%; H, 7.06%; O, 32.37%; N, 5.92%.

EXAMPLE XI

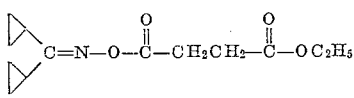

*O-(β) Carbethoxypropionyl Dicyclopropylketoxime*

The product of this example, which represents an ester form of the compound of Example X, is prepared according to the process steps of Example III with the single exception that β-carbethoxypropionyl chloride is substituted for the cyclopropanecarbonyl chloride of Example III. The product, o-(β) carbethoxypropionyl dicyclopropylketoxime, is collected in a yield of 76%, B.P. 153–155° C. (0.6 mm.), $n_D^{25}$ 1.4883.

*Analysis.*—Calcd. for $C_{13}H_{19}NO_4$. Theory: C, 61.64%; H, 7.56%; N, 5.53%; O, 25.27%. Found: C, 61.48%; H, 7.68%; N, 5.72%; O, 25.20%.

EXAMPLE XII

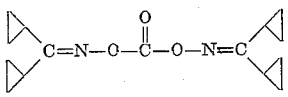

*Carbonyl-O,O'-Bis-Dicyclopropylketoxime*

A solution is prepared from 10 g. (0.1 mole) of phosgene in 150 cc. of dry toluene. The solution is cooled to 4° C. by means of an ice-bath at which time there is added dropwise thereto 20.4 g. (0.2 mole) of triethylamine and 25 g. (0.2 mole) of dicyclopropylketoxime in 30 cc. of dry chloroform. The temperature of the reaction is not allowed to rise above 12° C. during said addition, and after said addition is complete, the mixture is stirred at room temperature overnight. Following this procedure, an equal volume of ether is added and the mixture is filtered. The formed triethylamine hydrochloride is washed with ether and the washes are combined with the filtrate. The filtrate is concentrated and there is obtained therefrom 15.1 g. of the solid product which is subsequently recrystallized from a benzene-pentane mixture, whereupon the product, carbonyl-o,o'-bis-dicyclopropylketoxime, is collected in a yield of 13 g. (77%), M.P. 113–114° C.

*Analysis.*—Calcd. for $C_8H_{12}N_2O_2$. Theory: C, 57.13%; H, 7.19%; N, 16.66%; O, 19.03%. Found: C, 57.19%; H, 7.30%; N, 16.63%; O, 19.10%.

EXAMPLE XIII

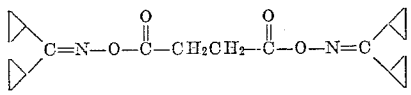

*Succinyl-O,O'-Bis-Dicyclopropylketoxime*

The bis product of this example is prepared according to the process steps of Example III with the exception that succinyl chloride is substituted for the cyclopropanecarbonyl chloride reactant of Example III and with the further exception that two moles of dicyclopropylketoxime and triethylamine are reacted with one mole of succinyl chloride. The compound, succinyl-O,O'-bis-dicyclopropylketoxime, is collected in a yield of 40%, M.P. 109–110° C.

*Analysis.*—Calcd. For $C_{18}H_{24}N_2O_4$. Found: C, 65.04%; H, 7.28%; N, 8.43%; O, 19.25%. Theory: C, 64.8%; H, 7.35%; N, 8.50%; O, 19.16%.

Others may practice the invention in any of the numerous ways which will be suggested by this disclosure to one skilled in the art. All such practice of the invention is considered to be a part hereof provided it falls within the scope of the appended claims.

I claim:

1. A compound of the formula:

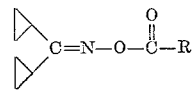

where R is selected from the class consisting of loweralkyl, loweralkoxy, trichloro methyl, lowercycloalkyl, 3,4,5 trimethoxyphenyl,

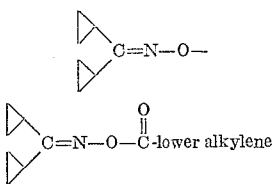

lower alkylene-$\overset{O}{\underset{\|}{C}}$—O R' where R' is selected from the class consisting of H and loweralkyl.

2. A compound of the formula:

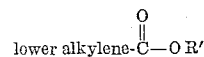

3. A compound of the formula:

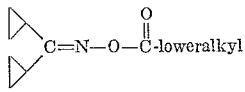

where *n* is 1 to 5.

4. A compound of the formula:

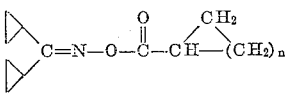

5. A compound of the formula:

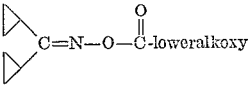

6. A compound of the formula:

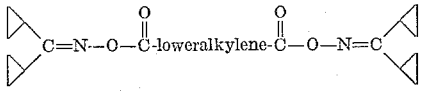

References Cited in the file of this patent

UNITED STATES PATENTS 2,916,417    Horrom    Dec. 8, 1959

OTHER REFERENCES

Hart et al.: "J. A.C.S." 78, pages 112–16 (1956).